`3,808,279`
PROCESS FOR THE MANUFACTURE OF α,α'-BIS-(HYDROXYPHENYL)-DIISOPROPYLBENZENES
Hans-Josef Buysch, Dieter Freitag, and Heinrich Krimm, Krefeld, Germany, assignors to Bayer Aktiengesellschaft, Leverkusen, Germany
No Drawing. Filed May 10, 1971, Ser. No. 142,061
Claims priority, application Germany, June 6, 1970,
P 20 27 986.1
Int. Cl. C07c *37/00, 39/16*
U.S. Cl. 260—619 B      4 Claims

ABSTRACT OF THE DISCLOSURE

The present invention relates to a process for the manufacture of α,α' - bis(hydroxyphenyl)-diisopropylbenzenes by reaction of phenols with compounds of the formula

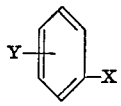

in which
X and Y are in the m- or p-position to one another and are identical or different and denote isopropenyl, α-hydroxy-isopropyl, α-methoxyisopropyl or α-carboxyisopropyl.

---

The present invention relates to a process for the manufacture of α,α' - bis-(hydroxyphenyl)-diisopropylbenzenes by reaction of phenols with compounds of the formula

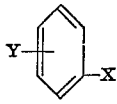

in which
X and Y are in the m- or p-position to one another and are identical or different and denote isopropenyl, α-hydroxy-isopropyl, α-methoxyisopropyl or α-carboxyisopropyl.

It is known to manufacture α,α'-bis-(4-hydroxyphenyl)-diisopropylbenzenes by reaction of phenols, having a free p-position relative to the hydroxyl group, with α,α'-dihydroxy-diisopropylbenzenes, α,α' - dichlorodiisopropylbenzenes or diisopropenylbenzenes in the presence of strong mineral acids, especially hydrogen chloride or Lewis acids as catalysts, preferably in the absence of water (U.S.A. patent specification 3,393,244, British patent specification 932,881 and Belgian patent specification 614,663). Because of the strong acids, the reaction mixtures are highly corrosive, so that it is necessary to use non-corroding and expensive reaction vessels. For working-up the reaction mixtures, the catalysts must be entirely removed by expensive measures, for example neutralization, extraction and distillation, and are thereby at least partially lost. Above all, however, this process only permits α,α'-bis-(4-hydroxyphenyl)-diisopropylbenzenes to be manufactured, because, even if the 2- and 3-positions relative to the hydroxyl groups of the phenols are free, practically only p-substitution occurs.

It has now been found, contrary to the teaching of German published specification 1,297,101, according to which a reaction of the phenols with the compounds mentioned practically does not occur without strong acid catalysts, that α,α' - bis-(hydroxyphenyl)-diisopropylbenzenes are obtained in very good yields if an excess of the phenols is heated with the compounds mentioned to temperatures of between about 130° and about 350° C., preferably between about 150° and about 300° C., optionally in the presence of only weakly acid catalysts.

If the process starts from phenols which apart from a free p-position relative to the hydroxyl group or the hydroxyl groups, also have at least one free o-position or two free o-positions, none of these possible substitution points is preferred, so that hitherto not obtainable isomer mixtures result, in which the ratio of o-p-substitution in the phenol nuclei is between about 3:7 and about 7:3. These mixtures have unexpected properties, which are advantageous for certain end uses. They are non-crystallizing resins which flow at temperatures below 100° C. and are miscible in any ratio with almost all organic solvents. This results in significant advantages in further processing, either as a melt or in solution, over the pure p-isomers, which are crystalline, high melting and insoluble, or only sparingly soluble, under normal conditions in the customary organic solvents.

The subject of the invention is hence a process for the manufacture of α,α'-bis-(hydroxyphenyl)-diisopropylbenzenes by reaction of the abovementioned compounds, which is characterized in that an excess of phenols which possess at least one free p- or o-position relative to the hydroxyl groups, is heated with the compounds mentioned, optionally in the presence of only weakly acid catalysts, to temperatures of between about 150 and about 300° C., until conversion is as extensive as possible.

Suitable compounds of the above formula are, for example, α,α' - dihydroxy-p-diisopropylbenzene, α,α'-dihydroxy-m-diisopropylbenzene, α - hydroxyisopropyl-p-isopropenylbenzene, α - hydroxyisopropyl-m-isopropenylbenzene, m- and p-diisopropenylbenzene, α,α'-dimethoxy-p-diisopropylbenzene, α,α' - dimethoxy-m-diisopropylbenzene, α,α'-carboxy-p-diiosopropylbenzene and α,α'-carboxy-m-diisopropylbenzene or mixtures of these compounds.

Suitable phenols are, for example, phenol itself and those phenols which possess at least one free p- or o-position, such as o-, m- and p-cresol, o-chlorophenol, o-isopropylphenol, o-cyclohexylphenol, o-phenylphenol, pyrocatechol, resorcinol, hydroquinone and o-methoxyphenol.

The molar ratio of the phenols to the compounds of the above formula should be at least 2:1. There are theoretically no upper limits, but practical requirements suggest that a restriction of the molar ratio to between 10:1 and 20:1 is sensible.

The requisite minimum temperature is determined by the reactivity of the reactants. Thus, for example, o-cresol requires a higher temperature than phenol.

Depending on requirements, the reaction can be carried out at normal pressure, elevated pressure or reduced pressure. To achieve a rapid reaction, a temperature above the boiling point of the reactants, and hence also the use of elevated pressure, is normally advisable, however.

As has already been explained, it is part of the essential characteristic of the invention that the process can be carried out without catalysts and that hence the hitherto not available isomer mixtures of α,α'-bis-(hydroxyphenyl)diisopropylbenzenes can be manufactured. It is, however, also possible conjointly to use weakly acid substances without thereby significantly changing the isomer ratio and without promoting side reactions, such as the oligomerization of diisopropenylbenzenes, which are observed when using strongly acid catalysts and an elevated temperature (compare German published specification 1,297,101 and U.S. patent specification 3,004,953). The catalytic effect of such weakly acid additives is however only slight, so that their use is generally dispensed with, especially since, with them, working-up frequently becomes more involved.

Weak acids in this sense are, for example monocarboxylic acids, such as acetic acid, propionic acid, butyric acid, trimethylacetic acid, benzoic acid, adipic acid, the phthalic acids, sebacic acid and derivatives of carboxylic acids, such as salts with metals, with ammonia and with amines, which act as acids under the reaction conditions, for example calcium benzoate, zinc acetate, iron-II propionate, ammonium acetate and ammonium butyrate.

Water does not interfere with the reaction unless it is present in such large amounts that the reaction mixture becomes unnecessarily diluted. It is therefore not necessary to separate off the water of reaction produced during the reaction with $\alpha,\alpha'$-dihydroxydiisopropylbenzenes. It is also possible to use phenol containing water. However, an azeotropic dehydration can also be carried out during the reaction.

The process according to the invention can be carried out discontinuously or continuously, in bulk and in solvents, and in the latter case the solvents should be inert and should dissolve the reactants, as in the case of benzene, toluene, xylene, diisopropylbenzene, chlorobenzene and dichlorobenzene. A reaction without solvents is however in most cases to be preferred.

Working-up is simple. After distilling off the unreacted material the residue can be immediately used further if slight colored contaminations are unimportant; alternatively, it can be purified according to known methods, such as distillation or adsorptive decoloration.

The yields of crude product are up to 100%, and the yields of pure product up to 97%, of theory.

The $\alpha,\alpha'$ - bis - (hydroxyphenyl) - diisopropylbenzene isomer mixtures according to the invention can, as already indicated above, be stored in bulk and in solution of any desired concentration without crystallization occurring, and, being bisphenols, are outstandingly suitable for the manufacture of plastics, such as epoxide resins and polyester resins.

EXAMPLE 1

(a) A mixture of 600 g. (6.4 mols) of phenol (freshly distilled) and 125 g. (0.64 mol) of $\alpha,\alpha'$-dihydroxy-p-diisopropylbenzene is kept for three hours at 250° C. in a nickel autoclave, under nitrogen and with stirring. Thereafter, the product is fractionally distilled in vacuo. After a first run of water, phenol and unreacted or incompletely reacted alkylating agent, 144 g. of a pale yellow, viscous product, which solidifies to a glass, pass over at between 210° C. and 260° C. (distillation residue 9 g.). According to IR analysis and NMR analysis, the product is a o-/p-isomer mixture of $\alpha,\alpha'$-bis-(hydroxyphenyl)-p-diisopropylbenzene. The content of phenolic OH is 9.5% (calculated, 9.87%). The conversion of alkylating agent is 71%, and the yield of bisphenol isomer mixture is 91% of theory, relative to the conversion.

(b) If the above reaction is carried out at 200° C., 77 g. of isomer mixture are obtained, corresponding to a conversion of 37% and a yield of 93% of theory.

50% strength solutions of the reaction product in methanol, butanol, butyl acetate, toluene and chloroform can be stored for weeks without crystallization occurring.

EXAMPLE 2

A mixture of 500 g. (5.3 mols) of phenol and 97 g. (0.5 mol) of $\alpha,\alpha'$-dihydroxy - p - diisopropylbenzene is heated at normal pressure under nitrogen, whilst stirring, and under reflux, the water of reaction being allowed to distil off until the sump temperature exceeds 180° C. The residue is then kept for a further 10 hours at 183°–188° C. The subsequent fractional distillation, after a first run of phenol and alkylating agent, yields 82 g. of a pale yellowish, resinous distillate (boiling point$_{0.01}$ 210–250° C.), which according to IR and NMR analysis represents a o-/p-isomer mixture of $\alpha,\alpha'$-bis-(hydroxyphenyl)-p-diisopropylbenzene and contains 10.1% of phenolic OH (calculated, 9.87%). The yield is 91% of theory, relative to a 52% conversion of alkylating agent.

EXAMPLE 3

A mixture of 900 g. (9.6 mols) of phenol and 94 g. (0.59 mol) of p-diisopropenylbenzene is kept for 5 hours at 250° C., under nitrogen, whilst stirring. Distillation yields 102 g. of resinous bisphenol isomer mixture (boiling point$_{0.2}$ 220–270° C.; 5 g. of distillation residue), corresponding to a yield of 95% of theory, at a conversion of diisopropenylbenzene of 31%.

EXAMPLE 4

A mixture of 1000 g. (10.6 mols) of phenol and 125 g. (0.64 mol) of $\alpha,\alpha'$-dihydroxy-m-diisopropylbenzene is kept for 7 hours at 250° C., under nitrogen and whilst stirring. The fractional vacuum distillation yields 129 g. (boiling point $_{1.5}$ 225–275° C.) of a colorless resin which solidifies to a glass, does not crystallize after standing for weeks, is soluble in practically all organic solvents other than paraffins, according to IR and NMR analysis represents a mixture of o-/p-isomers of $\alpha,\alpha'$-bis-(hydroxyphenyl) - m - diisopropylbenzene, and contains 9.7% of phenolic OH (calculated, 9.87%).

EXAMPLE 5

A mixture of 282 g. (3 mols) of phenol, 158 g. (1 mol) of p-diisopropenylbenzene and 5.0 g. of zinc acetate is boiled for 4 hours under reflux, whilst stirring. After cooling, the mixture is taken up in benzene and the solution is washed with ammonia solution and with water, and distilled. 91 g. of colorless isomer resin, solidifying to a glass, and 16 g. of distillation residue, are obtained, corresponding to a conversion of 29% and a yield of 81% of theory.

EXAMPLE 6

A mixture of 1000 g. (9.3 mols) of o-cresol and 160 g. (0.82 mol) of $\alpha,\alpha'$-dihydroxy-p-diisopropylbenzene is heated for 5 hours in an autoclave at 270° C. Fractional distillation yields 81 g. (boiling point $_{0.1}$ 210–252° C.) of a yellow, noncrystallizing resin containing 8.8% of phenolic OH (calculated, 9.08%), corresponding to a conversion of 31% and a yield of $\alpha,\alpha'$-bis-(o-cresyl)-p-diisopropylbenzene, relative thereto, of 84% of theory.

EXAMPLE 7

A mixture of 3200 g. of phenol (34 mols), 640 g. (3.3 mols) of $\alpha,\alpha'$-dihydroxy-m-diisopropylbenzene and 190 g. of ammonium acetate is heated to the boil (150°–160° C. sump temperature), and the water of reaction is removed azeotropically. The temperature is then raised and the mixture kept at 180°–183° C. for 15 hours. Fractional distillation yields 349 g. (boiling point $_{0.05}$ 193–225° C.) of a practically colorless $\alpha,\alpha'$ - bis - (hydroxyphenyl)-m-diisopropylbenzene isomer mixture containing 9.8% of phenolic OH (calculated, 9.87%) and 9 g. of a distillation residue corresponding to a conversion of 35% and a yield of 97% of theory.

What is claimed is:

1. A process for the manufacture of $\alpha,\alpha'$-bis-(hydroxyphenyl)-diisopropylbenzenes which comprises heating (a) a phenol selected from the group consisting of phenol, o-cresol, m-cresol, p-cresol, o-chlorophenol, o-isopropylphenol, o-cyclohexylphenol, o-phenylphenol, pyrocatechol, resorcinol, hydroquinone and o-methoxyphenol and (b) at least one compound of the formula

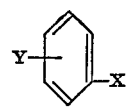

wherein X and Y are in the m- or p-position to one another, are identical or different and are selected from the group consisting of isopropenyl, $\alpha$-hydroxyisopropyl, $\alpha$-methoxyisopropyl and $\alpha$-carboxyisopropyl in a molar ratio of (a):(b) of at least 2:1 to a temperature of between about 150 and about 300° C. in the absence of a catalyst until the desired product is obtained.

2. The process of claim 1 wherein the molar ratio of (a):(b) is 10:1 to 20:1.

3. Isomer mixtures comprising α,α'-bis-(hydroxyphenyl)-1,3-diisopropylbenzene wherein the hydroxy substituents are in the ortho and para positions on said phenyl nuclei and the ratio of total ortho-hydroxy substituents to total para-hydroxy substituents is between about 3:7 and about 7:3.

4. Isomer mixtures comprising α,α'-bis-(hydroxyphenyl)-1,4-diisopropylbenzene wherein the hydroxy substituents are in the ortho and para positions on said phenyl nuclei and the ratio of total ortho-hydroxy substituents to total para-hydroxy substituents is between about 3:7 and about 7:3.

References Cited
UNITED STATES PATENTS

| | | | |
|---|---|---|---|
| 3,293,213 | 12/1966 | Barton et al. | 260—619 BX |
| 3,309,339 | 3/1967 | Barton et al. | 260—619 BX |
| 3,393,244 | 7/1968 | Broderick et al. | 260—619 B |

FOREIGN PATENTS

| | | | |
|---|---|---|---|
| 935,061 | 8/1963 | Great Britain | 260—619 B |
| 932,811 | 7/1963 | Great Britain | 260—619 B |

BERNARD HELFIN, Primary Examiner

U.S. Cl. X.R.

260—47 R